340-690
7/22/80    OR    4,214,238

United States Patent [19]
Adams et al.

[11] 4,214,238
[45] Jul. 22, 1980

[54] SEISMIC TRIGGER

[75] Inventors: William M. Adams, Honolulu, Hi.; Robert F. Blakely, Bloomington, Ind.; Charles R. Ellis, Bloomington, Ind.; Judson Mead, Bloomington, Ind.

[73] Assignee: Indiana University Foundation, Bloomington, Ind.

[21] Appl. No.: 775,591

[22] Filed: Mar. 8, 1977

[51] Int. Cl.² .............................................. G08B 21/00
[52] U.S. Cl. .................................... 340/690; 33/366; 73/654; 200/61.45 R; 200/DIG. 8; 340/540
[58] Field of Search ................ 390/261; 340/540, 690, 340/683, 566, 601; 200/DIG. 8, 61.45 R; 33/366, 391, 397; 73/654, 653, 652

[56] References Cited
U.S. PATENT DOCUMENTS 3,709,030   1/1973   Aselman, Jr. .......................... 340/261
3,774,190  11/1973   Kyle, Jr. .............................. 340/261

OTHER PUBLICATIONS

Adams, et al., "A Seismic Trigger for Real-Time Warning Local Tsunami Potentiality", *Earthquake Notes*, vol. 46, No. 4, Oct.–Dec. 1975.

*Primary Examiner*—Glen R. Swann, III
*Attorney, Agent, or Firm*—Kirkland & Ellis

[57] ABSTRACT

An inverted, compound pendulum, which may be set in motion by a seismic variance, activates a photoelectric switching system. Logic circuitry in electrical contact with the switching system discriminates in a pre-determined manner with respect to the repetition rate of signals transmitted by the switching system and selectively activates and controls an alarm. Circuitry in the device permits display of the device's status and interacts with a self-contained power source to permit continued operation despite interruption of external power.

10 Claims, 3 Drawing Figures

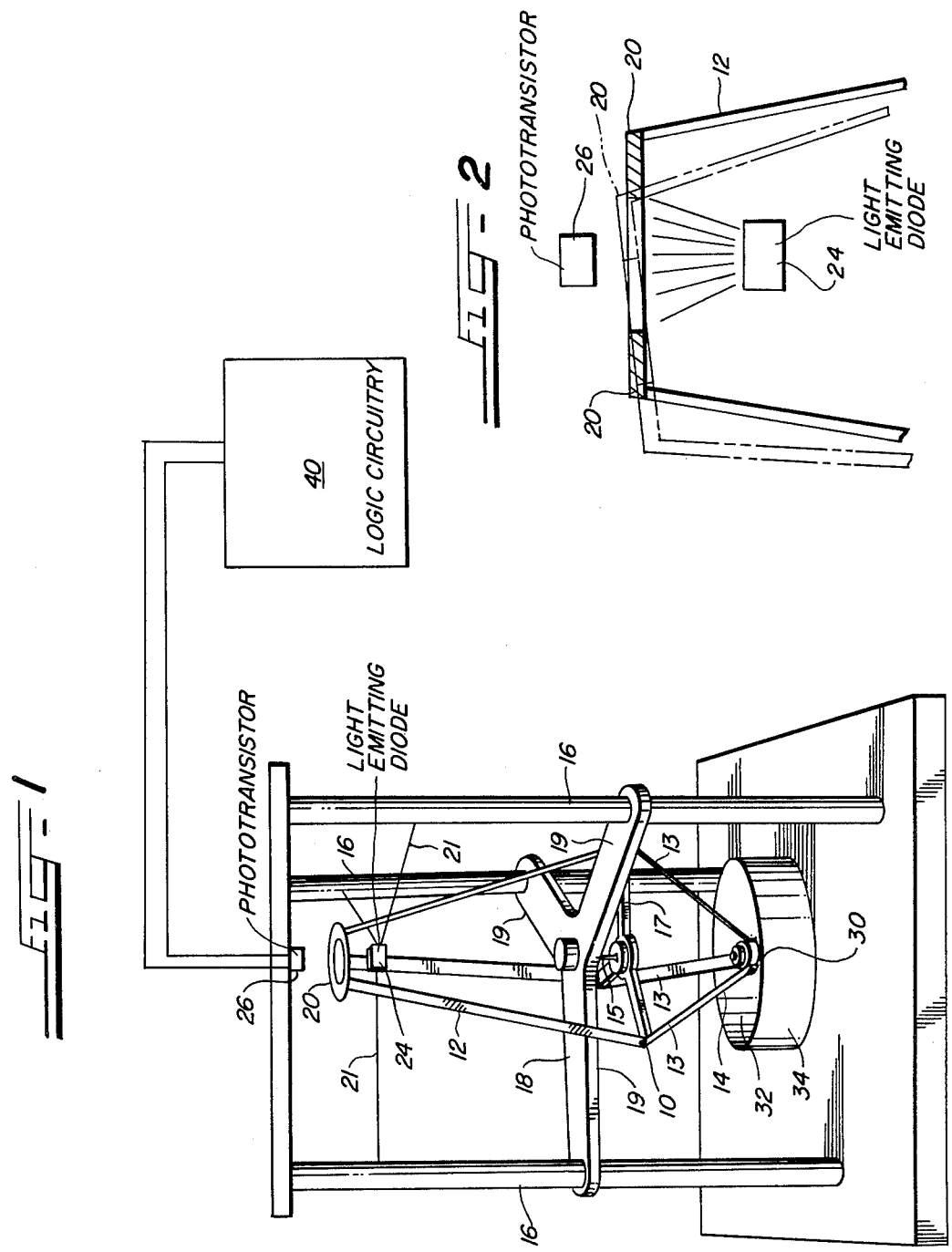

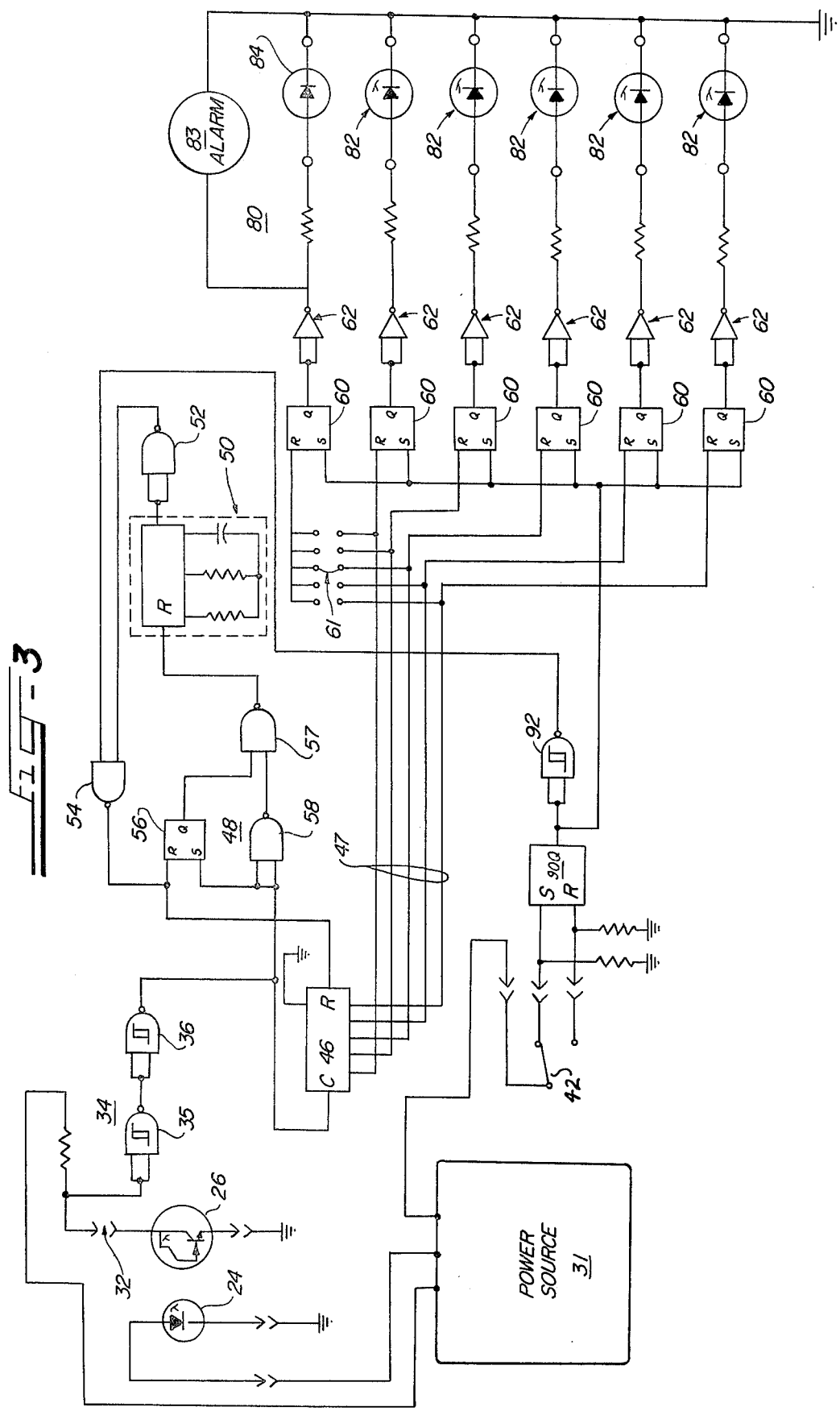

SEISMIC TRIGGER

BACKGROUND OF THE INVENTION

1. Field Of The Invention

The present invention relates to a seismic device, and more particularly to a discriminating seismic trigger.

2. Description Of The Prior Art

The potentially devastating effects of seismic variances, such as earthquakes, is well known. Detectors exist which trigger alarms in response to seismic activity. Such detectors may be utilized for warning workers in hazardous environments, such as mines or construction sites, in systems designed to shut-down nuclear reactors and to stop trains, and in other alarm or control systems. However, extant detectors are often unreliable in that they trigger false alarms in response to cultural seismic variances or due to instrument malfunction. The costs associated with such false alarms can be substantial, such as the unnecessary shut-down of a nuclear power plant.

Severe seismic disturbances sometimes generate so-called "tidal waves" (called "tsunamis" in some areas), which can cause devastation to coastlines in their path. Seismic variance detectors presently in existence are not capable of reliably discriminating between large seismic disturbances, which may trigger a tidal wave, and smaller seismic disturbances which are not likely to generate significant tidal waves.

BRIEF DESCRIPTION OF THE INVENTION

A device for detecting seismic variances comprises a power source, an photoelectric switching means in a circuit with the power source, a pendulum means moveably mounted such that oscillation of the pendulum means activates the switching means, and a response means in the circuit with the power source and the switching means for registering the activation of the switching means and responding in a pre-determined manner to the repetition rate of the pendulum's oscillation.

Thus, it is a primary object of the present invention to provide a seismic variance detector which discriminates between genuine seismic disturbances and cultural seismic variances or instrument malfunction.

It is a further object of the present invention to provide a seismic variance detector which can be programmed to discriminate between seismic disturbances likely to cause tidal waves and those not likely to.

DESCRIPTION OF THE DRAWINGS

FIG. 1 is a perspective, partially schematic view of the preferred embodiment of a seismic variance detector according to the invention.

FIG. 2 is an enlarged, cross-sectional, partially schematic view of the pendulum and switch portion of the preferred embodiment illustrated in FIG. 1.

FIG. 3 is a schematic diagram of the logic circuitry of the preferred embodiment of a seismic variance detector according to the invention.

DETAILED DESCRIPTION

As shown in FIG. 1, an inverted compound pendulum 10 comprises an upper portion 12 and a lower portion 14, that are constructed of any suitable rigid material such as metal or plastic. An inverted, compound pendulum, as shown in FIG. 1, has it mass distributed rather than concentrated, and the greater extension of its mass located above the fulcrum. Pendulum 10 is suspended at its center of gravity by a wire 15 attached to a structure 18 mounted on a base 16 that is suitably designed to provide support for but allow free movement of pendulum 10. In the preferred embodiment, support structure 18 comprises three members 19 mounted between three vertical members 16 and wire 15 is connected between members 19 and the center junction of members 17 mounted to the members 13 of pendulum 10.

The upper portion 12 of pendulum 10 ends at an annular disc 20, which in the preferred embodiment comprises a disc of rigid material, such as metal or plastic, with an opening at its center.

An infrared light emitting diode 24 is suspended beneath annular disc 20 by wires 21 and is oriented such that infrared rays pass through the opening in disc 20. A detecting means 26, such as a phototransistor, is positioned above annular disc 20 such that the infrared rays emitted from diode 24 fall on detector 26 after passing through the opening in disc 20. Although the preferred embodiment contains only one diode/detector pair, alternatively a plurality of switch configurations can be provided.

A wire mesh 30 is attached to the lower portion 14 of pendulum 10. Wire mesh 30 is partially submerged in a suitably viscous substance 32, such as oil, contained in dish 34. As pendulum 10 moves, wire mesh 30 moves through the substance in dish 34, which dampens the pendulum's movement. The amount of dampening is controlled by the viscosity of the substance in dish 34, the density of wire mesh 30 and the extent to which wire mesh 30 is submerged in the substance in dish 34. Other suitable damping means may be substituted.

When there is no significant seismic disturbance pendulum 10 is at rest. Diode 24 emits infrared rays, which pass through the opening in disc 20 and are received by detector 26. When pendulum 10 is at rest, annular ring 20 does not interrupt the rays emanating from diode 24, and diode 24 and detector 26 form a complete circuit. However, as shown more clearly in FIG. 2, if pendulum 10 begins to move, such as in response to a seismic disturbance, disc 20 will interrupt or deflect the rays emanating from diode 24, thus breaking the infrared contact between diode 24 and detector 26.

As shown in FIG. 1, detector 26 is electrically connected to logic circuitry 40. Referring to FIG. 3, diode 24 (type ME-7124) emits infrared rays, which activates phototransistor 26 (type CE-L14F1) turning it "on", thereby completing the circuit between input 32 from power source 31 and ground. If the infrared rays of diode 24 are interrupted, such as by disc 20 of pendulum 10, phototransistor 26 is biased "off", thus breaking the circuit through phototransistor 26. When phototransistor 26 is biased "off", Schmidt trigger 34, comprised of NAND gates 35 and 36 (both type CD 4093), is triggered. This design of the circuitry, i.e., phototransistor 26 is conductive when the pendulum is quiescent, enhances the reliability of the detector. For example, if there is a malfunction in diode 24 or detector 26 causing a break in the detection circuit, the Schmidt trigger 34 will emit a pulse which can alert an operator of a malfunction.

The Schmidt trigger 34 emits a "one" pulse, which causes an integrated circuit decade counter 46 (type CD 4017) to advance one count and also triggers timing cycle re-start circuitry 48, comprising NAND gates 57 and 58 (type CD 4011) and RS flip flop 56 (type CD 4043). The pulse from Schmidt trigger 34 causes NAND gate 58 to apply a "zero" to one input of NAND gate 57. The "Q" output of RS flip flop 56 is normally zero, so a "one" pulse is applied to the R input of integrated Circuit timer 50, automatically removing the reset and starting timer 50. After approximately ten seconds (or any variable selected time) timer 50 emits a "one" pulse to NAND gate 52 (type CD 4011) which in inverted and applied to one input of NAND gate 54. The other input of NAND gate 54 in normally "zero", so that a "one" pulse is emitted from NAND gate 54 and is applied to the "R" input of RS flip flop 56, locking the "Q" output to zero. Simultaneously, a one pulse is applied to the "R" input of counter 46, resetting counter 46. The provision of reset time 50 permits discrimination with respect to the repetition rate of pulses that will trigger a response such as an alarm. Thus, for example, it can be arranged such that the decade counter will count and accumulate pulses only if it receives successive pulses from Schmidt trigger 34 within a selected time period or time window. This time window is varied by variation of the delay between signals emanating from the reset timer.

The output count from decade counter 46 passes through conductors 47 and is stored on integrated circuit latches 60, (RS flip flops—type CD 4043). The output of latches 60 passes through buffers 62 (integrated circuit inverters type 74C918) to response/alarm circuit 80 and indicator diodes 82, which depict the state of latches 60. The number of pulses which trigger response/alarm circuitry 80 can be selectively pre-determined by appropriate placement of shunt conductor 61. Thus, the alarm will operate only if a preselected number of pulses is counted within the time controlled by timer 50, so that extraneous pulses representing cultural seismic variances or equipment malfunction will be disscriminated against, avoiding false alarms.

Response/alarm circuitry 80 preferably comprises both an audible alarm 83 and a visual alarm, in the form of an indicator diode 84. Alternatively, the circuitry could be designed to automatically shut-down machines or activate any additional circuitry desired.

Power source 31 is preferably a voltage regulated D.C. power source which rectifies line voltage for normal operation. However, because seismic disturbances may disrupt normal power sources, power source 31 is also equipped with a stand-by emergency battery, which is continuously re-charged during normal line voltage operation, but which can power the detector as the primary power source during interruption of normal power.

RS flip-flop circuit 90 can be activated manually by reset switch 42, to reset all latches 60 and reset timer 50, the latter via NAND gate 92 (type CD 4093).

It should be understood that various changes, modifications, and variations in the structure and function of the present invention may be effected without departing from the spirit and scope of the present invention as defined in the appended claims.

What we claim is:

1. A device for detecting seismic variances comprising:
    a power source;
    photoelectric switching means in circuit with said power source;
    inverted, compound pendulum means moveably mounted such that oscillation of said pendulum means activates said switching means; and
    response means, in circuit with said power source and said switching means, for registering the activation of said switching means and responding in a pre-determined manner only to a repetition rate of oscillation of the pendulum means equal to or greater than a selectable threshold.

2. A device as in claim 1, wherein said response means comprises electrical logic circuitry which selectively activates an alarm means in response to a repetition rate of oscillation of said pendulum means equal to or greater than a selectable threshold.

3. A device as in claim 2, wherein said logic circuitry comprises:
    means connected to said switching means for producing pulses in response to oscillation of said pendulum;
    counter means for commencing timing of a pre-determined timing period upon receipt of said pulses;
    reset means for restarting said timing means if a subsequent pulse is received during said timing period and for resetting said timing means and said counter means if no subsequent pulse is received during said timing period;
    latch means for latching and recording the count of said counter means; and
    control means for activating said alarm means only if a pre-determined number of pulses are counted by said counter means.

4. A device as claimed in claim 3, which further comprises visual indicating means for visually indicating the number of pulses counted by said counter means.

5. A device as claimed in claim 3, which further comprises means for resetting said counter means, timer means, and latch means in response to manual activation.

6. A device for detecting seismic variances comprising:
    a support means;
    an inverted, compound pendulum moveably supported by said support means;
    a deflector means mounted on said pendulum;
    a photoelectric switching means comprising a source of electromagnetic radiation and a detector sensitive to such electromagnetic radiation, oriented so that said deflector means interrupts the path of said electromagnetic radiation between said source and said detector when said pendulum oscillates;
    logic circuitry in circuit with said switching means and capable of registering the frequency and number of interruptions by said deflector means; and
    a response means in circuit with and activated by said logic circuitry only in response to a repetition rate of oscillation of said pendulum means equal to or greater than a selectable threshold.

7. A device as in claim 6, wherein said response means comprises an alarm.

8. A device as in claim 6, wherein said logic circuitry comprises:
    means connected to said switching means for producing pulses in response to oscillation of said pendulum;
    counter means for counting said pulses;
    timing means for commencing timing of pre-determined timing period upon receipt of said pulses;

reset means for restarting said timing means if a subsequent pulse is received during said timing period and for resetting said timing means and said counter means if no subsequent pulse is received during timing period;

latch means for latching and recording the count of said counter means; and control means for activating said response means if a pre-determined number of pulses are counted by said counter means.

9. A device as claimed in claim 8, which further comprises visual indicating means for visually indicating the number of pulses counted by said counter means.

10. A device as claimed in claim 8, which further comprises means for resetting said counter means, timer means, and latch means in response to manual activation.

* * * * *